United States Patent
Han et al.

(10) Patent No.: US 8,773,361 B2
(45) Date of Patent: Jul. 8, 2014

(54) DEVICE IDENTIFICATION METHOD AND APPARATUS, DEVICE INFORMATION PROVISION METHOD AND APPARATUS, AND COMPUTER-READABLE RECORDING MEDIUMS HAVING RECORDED THEREON PROGRAMS FOR EXECUTING THE DEVICE IDENTIFICATION METHOD AND THE DEVICE INFORMATION PROVISION METHOD

(75) Inventors: Kuk-hyun Han, Suwon-si (KR); Pil-seung Yang, Suwon-si (KR); Hark-joon Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 915 days.

(21) Appl. No.: 12/274,755

(22) Filed: Nov. 20, 2008

(65) Prior Publication Data

US 2009/0128517 A1    May 21, 2009

Related U.S. Application Data

(63) Continuation-in-part of application No. 12/133,812, filed on Jun. 5, 2008, now abandoned.

(30) Foreign Application Priority Data

Nov. 20, 2007  (KR) .................. 10-2007-0118531
Sep. 18, 2008  (KR) .................. 10-2008-0091774

(51) Int. Cl.
*G06F 3/041*    (2006.01)

(52) U.S. Cl.
USPC .................... 345/173; 345/158; 345/174

(58) Field of Classification Search
USPC ................... 345/156, 173, 174, 8
See application file for complete search history.

(56) References Cited

U.S. PATENT DOCUMENTS 5,914,701 A * 6/1999 Gersheneld et al. ......... 345/156
6,275,231 B1 * 8/2001 Obradovich ................ 345/156

(Continued)

FOREIGN PATENT DOCUMENTS

| EP | 1564917 A1 | 8/2005 |
| JP | 2007-20895 A | 2/2007 |
| KR | 10-2008-0107236 A | 12/2008 |

OTHER PUBLICATIONS

Nao Kobayashi et al., "A proposal of finger indentification scheme employing intra-body communications", IEEE, Jun. 24-28, 2007, pp. 6187-6192.*

(Continued)

*Primary Examiner* — Thuy Pardo
(74) *Attorney, Agent, or Firm* — Sughrue Mion, PLLC (57) ABSTRACT

Provided are a touch-screen based device identification and information provision method and apparatus, and computer-readable recording mediums having recorded thereon programs for executing the touch-screen based device identification method and the information provision method. The device identification method for a touch screen device includes propagating a signal induced by touching a touch screen surface to an external device via the person, receiving information about the signal detected by the external device and an identification (ID) of the external device through a communication channel, and identifying the external device by using the received information about the detected signal and the received ID of the external device. Thus, the touch screen device and the external device can be connected to each other in real time by a simple and physical touch.

40 Claims, 6 Drawing Sheets

(56) References Cited

U.S. PATENT DOCUMENTS

| | | |
|---|---|---|
| 7,907,895 B2 | 3/2011 | Shinagawa et al. |
| 8,188,937 B1 * | 5/2012 | Amafuji et al. ............... 345/8 |
| 8,378,967 B2 * | 2/2013 | Noda et al. ............... 345/156 |
| 2002/0122064 A1 | 9/2002 | Yamakado |
| 2004/0189594 A1 | 9/2004 | Sterling |
| 2005/0017841 A1 | 1/2005 | Doi et al. |
| 2006/0245621 A1 | 11/2006 | Uno |
| 2008/0198138 A1 * | 8/2008 | McFarlane et al. ......... 345/173 |
| 2008/0259042 A1 * | 10/2008 | Thorn ............... 345/173 |
| 2008/0259043 A1 * | 10/2008 | Buil et al. ............... 345/173 |
| 2008/0303682 A1 | 12/2008 | Han |
| 2009/0225036 A1 * | 9/2009 | Wright ............... 345/173 |
| 2011/0102369 A1 * | 5/2011 | Thorn ............... 345/174 |

OTHER PUBLICATIONS

Communication from the European Patent Office issued May 7, 2012 in counterpart European Application No. 08169546.2.

Communication, dated Jul. 12, 2013, issued by the State Intellectual Property Office of P.R. China in counterpart Chinese Patent Application No. 200810181351.1.

Communication dated Jan. 13, 2014 issued by the State Intellectual Property Office of P.R. China in counterpart Chinese Application No. 200810181351.1.

* cited by examiner

DEVICE IDENTIFICATION METHOD AND APPARATUS, DEVICE INFORMATION PROVISION METHOD AND APPARATUS, AND COMPUTER-READABLE RECORDING MEDIUMS HAVING RECORDED THEREON PROGRAMS FOR EXECUTING THE DEVICE IDENTIFICATION METHOD AND THE DEVICE INFORMATION PROVISION METHOD

CROSS-REFERENCE TO RELATED PATENT APPLICATIONS

This is a Continuation-In-Part of application Ser. No. 12/133,812 filed Jun. 5, 2008. The entire disclosure of the prior application, application Ser. No. 12/133,812, is hereby incorporated by reference. This application claims the benefits of Korean Patent Application No. 10-2007-0118531, filed on Nov. 20, 2007, and Korean Patent Application No. 10-2008-0091774, filed on Sep. 18, 2008, in the Korean Intellectual Property Office, the disclosures of which are incorporated herein in their entirety by reference.

BACKGROUND OF THE INVENTION

1. Field of the Invention

The present invention relates to a method and apparatus for identifying a device and providing device information based on a touch screen and a recording medium, and more particularly, to a method and apparatus for identifying a device and providing device information based on a touch screen and a recording medium whereby the touch screen device can identify an external device such as a cellular phone, a digital camera, a camcorder, and a personal digital assistant (PDA) according to a user's manipulation, and computer-readable recording medium having recorded thereon programs for executing the above method.

2. Description of the Related Art

In order to technically implement a scenario in which a touch screen device and an external device interact with each other, the external device should be easily connectable to the touch screen device, and preferably the external device has to be connected in relation to coordinates on a graphic user interface (GUI) of the touch screen device.

A related art technique for a display device to identify an external device includes a radio frequency identification (RFID) scheme, a camera scheme, and a global positioning system (GPS) scheme. According to the RFID scheme, a tag reader is installed outside the display device and an RFID tag is attached to the external device in order to recognize an identification (ID) of the external device. According to the camera scheme, a camera is attached on or under a table display in order to recognize the position of the external device. According to the GPS scheme, the position of the external device is recognized using a GPS receiver.

However, the position of the external device cannot be known according to the RFID scheme, a recognition rate is low and high processor performance is required due to image processing according to the camera scheme, and a position error and device complexity increase in a small space such as the display device according to the GPS scheme.

Moreover, when the size of a touch screen surface is small, the external device and the touch screen device have to easily interact with each other.

SUMMARY OF THE INVENTION

The present invention provides The present invention provides a touch-screen based device identification method and apparatus in order to connect a touch screen device with an external device by simple physical touching, and a computer-readable recording medium having recorded thereon a program for executing the touch-screen based device identification method.

According to an aspect of the present invention, there is provided a device identification method for a touch screen device, the device identification method including: propagating a signal induced by touching a touch screen surface of the touch screen device to an external device through the person; receiving, at the touch screen device, information about the signal which is detected by the external device and an identification (ID) of the external device through a communication channel; and identifying, at the touch screen device, the external device based on the received information about the detected signal and the received ID of the external device.

The signal may be a micro-current signal including a scan frequency component.

The identifying the external device may include determining that the touch screen device is connected with the external device having the received ID via the person if a scan frequency component included in the information about the signal is the same as a scan frequency component of the signal induced by touching the touch screen surface.

The device identification method may further include: calculating first coordinates of the touched touch screen surface; and mapping the identified external device to the calculated first coordinates of the touched touch screen surface.

The device identification method may further include: when user verification information is stored in the external device, executing a user verification for allowing the external device to access the touch screen device or to access an object displayed on the first coordinates using the user verification information.

The external device may be another touch screen device in addition to the touch screen device, and the device identification method may further include: calculating first coordinates of the touched touch screen surface; and mapping second coordinates of the touched touch screen surface of another touch screen surface to the first coordinates, and the mapping may be performed through the communication channel.

The external device or the touch screen device may execute application services, which link the first coordinates with the second coordinates, based on the mapping result.

The device identification method may further include repeating the propagating the signal to the external device and the receiving the information through the communication channel after changing a scan frequency of the signal.

The device identification method may further include: receiving a confirmation request signal for identifying whether the touch screen surface of the touch screen device is touched or not from the external device through the communication channel; and transmitting a confirmation response signal which denotes that the touch screen surface of the touch screen device is touched to the external device through the communication channel.

The communication channel may be a wired or wireless channel using a plug and play (PnP) protocol including a universal PnP (UPnP) protocol.

The communication channel may be a wireless communication channel, and the wireless communication channel may include one or more selected from a wireless local area network (LAN), a wireless internet platform for interoperability (WIPI), Bluetooth, infrared communication, near field communication (NFC), and Zigbee, and the external device may exchange information about the wireless communication channel with the touch screen device.

The external device may be one of a cellular phone, a digital camera, a camcorder, a personal digital assistant, an MP3 player, and a portable multimedia player.

According to another aspect of the present invention, there is provided a device identification apparatus for a touch screen device, the device identification apparatus including: a touch sensing unit which generates a signal induced by touching a touch screen surface of the touch screen device; a reception unit which receives information about the signal propagated to the external device through the person and detected by an external device and an identification (ID) of the external device through a communication channel; and an identification unit which identifies the external device based on the received information about the signal and the received ID of the external device.

According to another aspect of the present invention, there is provided a device information provision method for an external device, the device information provision method including: detecting a scan frequency component from a signal induced by touching a touch screen surface of a touch screen device and propagated to the external device through the person; generating information about the scan frequency component and identification (ID) information of the external device; and transmitting the information about the scan frequency component and the ID information from the external device to the touch screen device through a communication channel.

According to another aspect of the present invention, there is provided a device information provision apparatus for an external device, the device information provision apparatus including: a detection unit which detects a scan frequency component from a signal induced by touching a touch screen surface of a touch screen device and propagated to the external device through the person; an information generation unit which generates information about the scan frequency component and identification (ID) information of the external device; and a transmission unit which transmits the information about the scan frequency component and the ID information to a touch screen device through a communication channel.

According to another aspect of the present invention, there is provided a computer-readable recording medium having recorded thereon a program for executing a device identification method for a touch screen device, the device identification method including: propagating a signal induced by touching a touch screen surface of the touch screen device to an external device through the person; receiving, at the touch screen device, information about the signal which propagated to and detected by the external device and an identification (ID) of the external device through a communication channel; and identifying, at the touch screen device, the external device based on the received information about the detected signal and the received ID of the external device.

According to another aspect of the present invention, there is provided a computer-readable recording medium having recorded thereon a program for executing a device information provision method for an external device, the device information provision method including: detecting, at the external device, a scan frequency component from a signal induced by touching a touch screen surface of a touch screen device and propagated to the external device through the person; generating, at the external device, information about the scan frequency component and identification (ID) information of the external device that has received the signal; and transmitting the information about the scan frequency component and the ID information from the external device to the touch screen device through a communication channel.

According to embodiments of the present invention, the external device detects the scan frequency component induced on the touch screen surface by touching the touch screen surface via the person, and thus, the touch screen device and the external device can be connected to each other in real time by a simple physical touch.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings. It should be noted that like reference numerals refer to like elements illustrated in one or more of the drawings. In the following description of the present invention, detailed descriptions of known functions and configurations incorporated herein will be omitted for conciseness and clarity.

Figure 1:
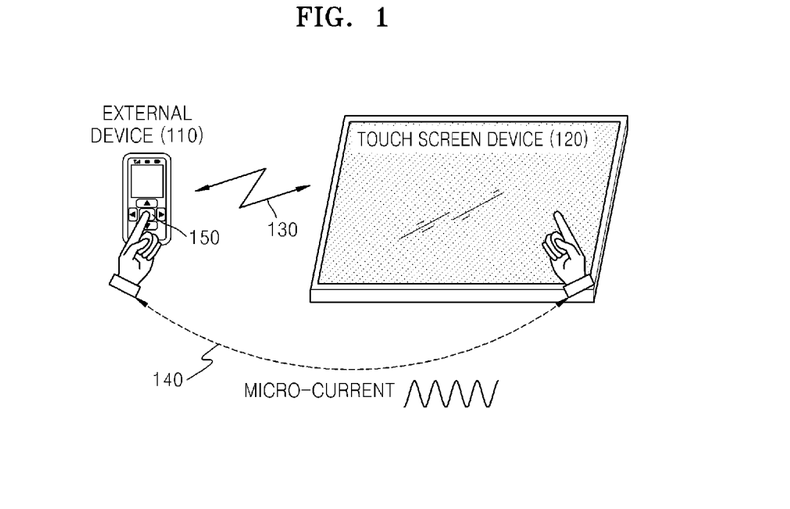
FIG. 1 illustrates a touch-screen based device identification system according to a first exemplary embodiment of the present invention.

FIG. 1 illustrates a touch-screen based device identification system according to a first exemplary embodiment of the present invention.

Referring to FIG. 1, the touch-screen based device identification system includes an external device 110 and a touch screen device 120. The external device 110 and the touch screen device 120 are connected with each other through a communication channel 130. It is assumed that a person 140 touches a touch screen surface of the touch screen device 120 with one hand while holding the external device 110 with the other hand. In another exemplary embodiment of the present invention, a person 140 may touch a touch screen surface of the touch screen device 120 by means of using a conductive medium such as metal.

The external device 110 is a consumer electronics (CE) device capable of communicating with another device through the communication channel 130. The external device 110 may be a cellular phone, a digital camera, a camcorder, a personal digital assistant (PDA), an MP3 player, or a portable multimedia player (PMP). In another exemplary embodiment of the present invention, the external device 110 may be another touch screen device in addition to the touch screen device 120.

A signal induced by touching a touch screen surface of the touch screen device 120 propagates to the external device 110 via the person 140. A detection unit 150 of the external device 110 detects a scan frequency component from the signal induced by a touch of the touch screen surface in the touch screen device 120.

Upon detection of the scan frequency component, the external device 110 generates information about the detected scan frequency component and ID information of the external device 110 and transmits the generated information and ID information to the touch screen device 120 through the communication channel 130. The external device 110 may include a band pass filter for detecting a micro-current signal that is induced from the touch screen surface and is received via the person 140. The micro-current signal propagating to the external device 110 is detected after passing through the band pass filter of the external device 110.

The touch screen device 120 is a device capable of performing specific processing by recognizing the position of a character or a particular position on the touch screen surface, which is touched by a human hand, without using a keyboard. A touch-screen scheme may be classified into types including a resistive film type and a static capacitance type. According to the static capacitance type, the touch screen surface is electrically charged, sensors are installed along the circumference of the touch screen surface, and a touched position is recognized by sensing the amount of electric charges lost by a touch.

Herein, the touch screen device 120 may be adapted by the static capacitance type. According to the static capacitance type, the touch screen device 120 performs a periodic scan in order to sense a touch. However, the touch screen device 120 is not limited to the static capacitance type, and may include all kinds of devices, in which micro-current signals including a certain frequency (for example, scan frequency) are induced when the touch screen surface is touched.

According to the static capacitance type, the touch screen device 120 performs scanning operation regularly to sense the touch. Thus, when the person 140 touches the touch screen surface of the touch screen device 120 with one hand while holding the external device 110 with the other hand, a micro-current including a particular frequency, e.g., a scan frequency, is induced by touching the touch screen surface. A micro-current signal including a scan frequency component, induced by touching the touch screen surface propagates to the external device 110 via the person 140.

The touch screen device 120 also receives information about the scan frequency component detected by the detection unit 150 and an ID of the external device 110 from the external device 110 through the communication channel 130. The touch screen device 120 recognizes that it is connected with the external device 110 via the person 140 by using the information about the detected scan frequency component and the ID of the external device 110, which are received from the external device 110.

In addition, in order to distinguish the touch screen device 120 that propagates the induced signal from a plurality of touch screen devices, the external device 110 may broadcast confirmation request signals, which identify whether the touch screen surface of the touch screen device 120 is touched or not, to a plurality of touch screen devices through communication channels. Then, the touch screen device 120, which propagates the signal induced by touching the touch screen surface to the external device 110, may transmit a confirmation response signal that notifies the touch to the touch screen surface to the external device 110 through the communication channel 130. The other touch screen devices, touch screen surfaces of which are not touched, may not transmit the confirmation response signal to the external device 110.

The communication channel 130 is a data transmission/reception path that is previously established before the person 140 touches the external device 110 and the touch screen device 120. Thus, the external device 110 and the touch screen device 120 are in a state where they can exchange data through the communication channel 130 whenever needed.

The communication channel 130 is a local connection using a plug-and-play (PnP) protocol such as a universal PnP (UPnP) protocol and may be a wired or wireless channel. In addition, the communication channel 130 may be wireless communication channel, and the wireless communication channel may include one or more of a wireless local area network (LAN), a wireless internet platform for interoperability (WIPI), Bluetooth, infrared communication, near field communication (NFC), and Zigbee.

In addition, the external device 110 exchanges information about the communication channel (for example, wireless communication channel) with the touch screen device 120, and may communicate through the selected communication channel based on the exchanged information. For example, when the external device 110 or the touch screen device 120 includes a plurality of communication channels, the external device 110 notifies the touch screen device 120 of the communication channels included in the external device 110, and the touch screen device 120 may select the appropriate communication channel by comparing the communication channels of the external device 110 with the communication channels of the touch screen device 120.

The person 140 can cause the external device 110 and the touch screen 120 to interact with each other by touching the touch screen surface of the touch screen device 120 with one hand while holding the external device 110 with the other hand. Since a human body is composed mostly of water including salt, the human body generally has the characteristics of a conductor at tens of KHz. Thus, a micro-current signal may propagate between the external device 110 and the touch screen 120 via the body of the person 140 who touches the external device 110 and the touch screen 120. In this state, the touch screen device 120 acts as if a position touched by the hand of the person 140 is touched by the external device 110 and can perform particular processing. That is, the touch screen device 120 calculates the first coordinates of the touched point on the touch screen surface, and then, maps the external device 110 to the first coordinates. Here, mapping allows various applications to be executed as if the external device 110 touches the first coordinates.

In addition, when the external device 110 stores personal information or verification information (hereinafter, referred to as 'user verification information'), services that allow the external device to access the touch screen device 120 or allow the external device to access the object displayed on the first coordinates of the touch screen device 120 can be provided using the user verification information.

In addition, as described above, the external device 110 may be another touch screen device in addition to the touch screen device 120.

Figure 7:
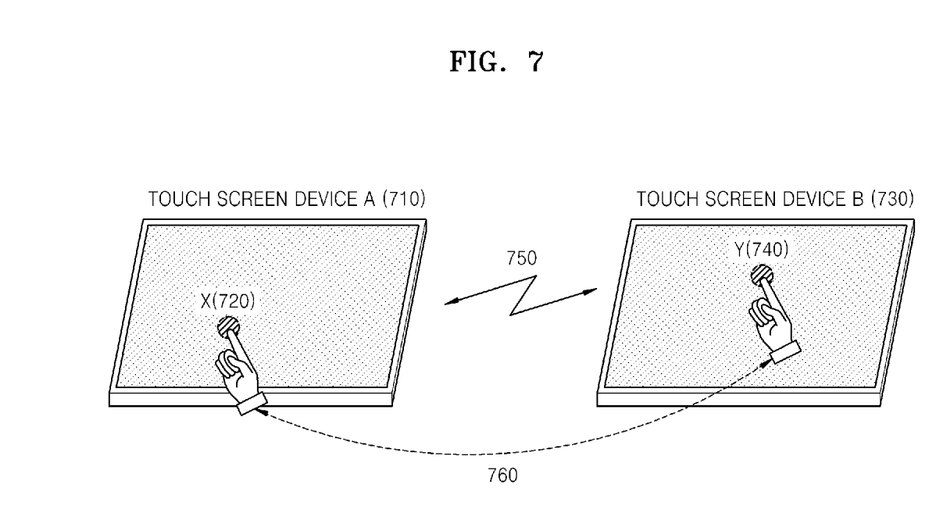
FIG. 7 illustrates a touch-screen based device identification system according to a fourth exemplary embodiment of the present invention.

FIG. 7 illustrates that the external device 110 is another touch screen device. Referring to FIG. 7, processes for a touch screen device A 710 to identify a touch screen device B 730 via person 760 (or opposite processes) are similar to those of the embodiment shown in FIG. 1. however, the touch screen devices A and B 710 and 730 may include detection units for detecting signals that are induced on touch screen surfaces of the counterpart touch screen devices 710 or 730 and are propagated. The detection units may be installed in the touch screen surface or on a position separated from the touch screen surface. The detection of the induced signals is described already with reference to FIG. 1, and thus, detailed descriptions thereof are omitted.

The touch screen device A 710 calculates first coordinates X 720 that represent touched location on the touch screen surface of the touch screen device A 710, and the touch screen device B 730 calculates second coordinates Y 740 that represent touched location on the touch screen surface of the touch screen device B 730. After that, the touch screen devices A and B 710 and 730 may perform the mapping operation of the first and second coordinates X 720 and Y 740 through a communication channel 750. Then, the touch screen devices A 710 and B 730 may execute an application service that links the first coordinates X 720 with the second coordinates Y 740 based on a result of the mapping operation. Through the above linkage between the coordinates, application services according to states of the touch screen devices and intention of the user can be provided.

For example, the touch screen device A 710 may transmit a control signal for allowing the object displayed on the first coordinates X 720 of the touch screen device A 710 (for example, icons, characters, products, or colors) to be displayed on the second coordinates Y 740 of the touch screen device 730 to the touch screen device B 730, or receives the control signal from the touch screen device B 730. For example, the color represented on the first coordinates X 720 may be equally displayed on the second coordinates Y 740, and the product displayed on the first coordinates X 720 may be moved to the second coordinates Y 740. On the other hand, the color represented on the second coordinates Y 740 may be equally displayed on the first coordinates X 720, and the product displayed on the second coordinates Y 740 may be moved to the first coordinates X 720.

Otherwise, a user interface such as a pop-up menu may be displayed in the touch screen devices, and thus, the user of the touch screen device A 710 or the touch screen device B 730 may select one of a plurality of services, coordinates of which can be linked with each other.

Figure 2:
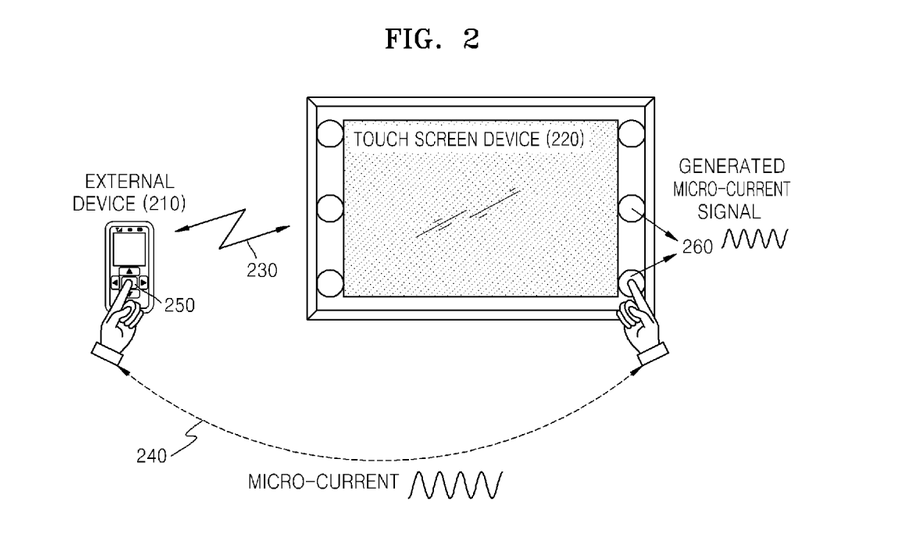
FIG. 2 illustrates a touch-screen based device identification system according to a second exemplary embodiment of the present invention.

FIG. 2 illustrates a touch-screen based device identification system according to a second exemplary embodiment of the present invention.

An external device 210, a communication channel 230, a person 240, and a reception unit 250, which are illustrated in FIG. 2, operate in the same manner respectively as the external device 110, the communication channel 130, the person 140, and the detection unit 150, which are illustrated in FIG. 1, and thus will not be described again.

While the touch screen device 120 illustrated in FIG. 1 operates by touching the touch screen surface, a touch screen device 220 illustrated in FIG. 2 operates by touching one of touch spots 260 installed along the circumference of the touch screen device 220. In other words, the touch screen 220 illustrated in FIG. 2 operates by a touch to the touch spot 260 instead of to the touch screen surface.

The person 240 indicates a particular position on the touch screen surface by touching the touch spot 260 in order to cause the touch screen device 220 to perform particular processing. The touch spot 260 is designed so that a micro-current having a scan frequency component can flow through the touch spot 260. Thus, once the person 240 touches the touch spot 260, a micro-current signal propagates to the external device 210 via the person 240. The touch screen device 220 receives information about the scan frequency component and an ID of the external device 210 from the external device 210.

Consequently, if the person 240 touches the touch spot 260 of the touch screen device 220 with one hand, the touch screen device 220 can recognize that it is connected with the external device 210 the person 240 holds with the other hand.

Figure 3:
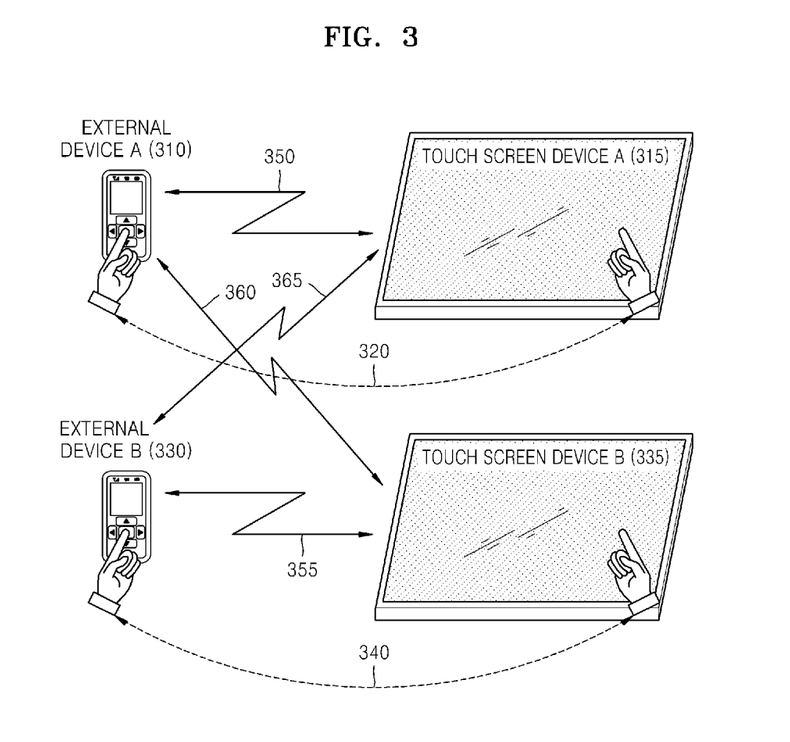
FIG. 3 illustrates a touch-screen based device identification system according to a third exemplary embodiment of the present invention.

FIG. 3 illustrates a touch-screen based device identification system according to a third exemplary embodiment of the present invention, in which there exists a plurality of external devices 310 and 330 or a plurality of touch screen devices 315 and 335.

For example, it is assumed that a person A 320 holds an external device A 310 with one hand and touches a touch screen device A 315 with the other hand. It is also assumed that a person B 340 holds an external device B 330 with one hand and touches a touch screen device B 335 with the other hand. If the person A 320 and the person B 340 touch the touch screen device A 315 and the touch screen device B 335, respectively, at almost the same time, the external devices A 310 and B 330 transmit information about scan frequency components and an ID of the external devices 310 and 320 to the touch screen device 315 and the touch screen device B 335 through communication channels 350 and 360 and communication channels 355 and 365, respectively. However, if scan frequencies of micro-current signals induced in the touch screen devices A 315 and B 335 are the same as each other, the touch screen device A 315 or B 335 cannot recognize which one of the external devices A 310 and B 330 it is connected with.

In this case, the touch screen device A 315 or B 335 may be designed in such a way as to change a scan frequency of a micro-current signal induced by touching a touch screen surface. For example, when the touch screen device A 315 or B 335 receives scan frequency information and an ID from the plurality of external devices 310 and 330 within a predetermined period of time, the touch screen device A 315 or B 335 temporarily changes a scan frequency. The touch screen device A 315 or B 335 then receives scan frequency information corresponding to the changed scan frequency and an ID from the external devices 310 and 330 again. However, if both the touch screen device A 315 and the touch screen device B 335 change scan frequencies to another same frequency, the problem described above may occur again. This problem may be solved by using a method of randomly determining a point of time for changing the scan frequency of the touch screen device A 315 or B 335 within a predetermined time range. However, in order to prevent the scan frequencies of the touch screen device A 315 and the touch screen device B 335 from being simultaneously changed to another same scan frequency, various methods may be used without being limited to the method described above.

Subsequently, the touch screen device A 315 or B 335 can identify the external device 310 or 330 connected with the touch screen device A 315 or B 335 by temporarily changing the scan frequency of the touch screen device A 315 or B 335.

Figure 4:
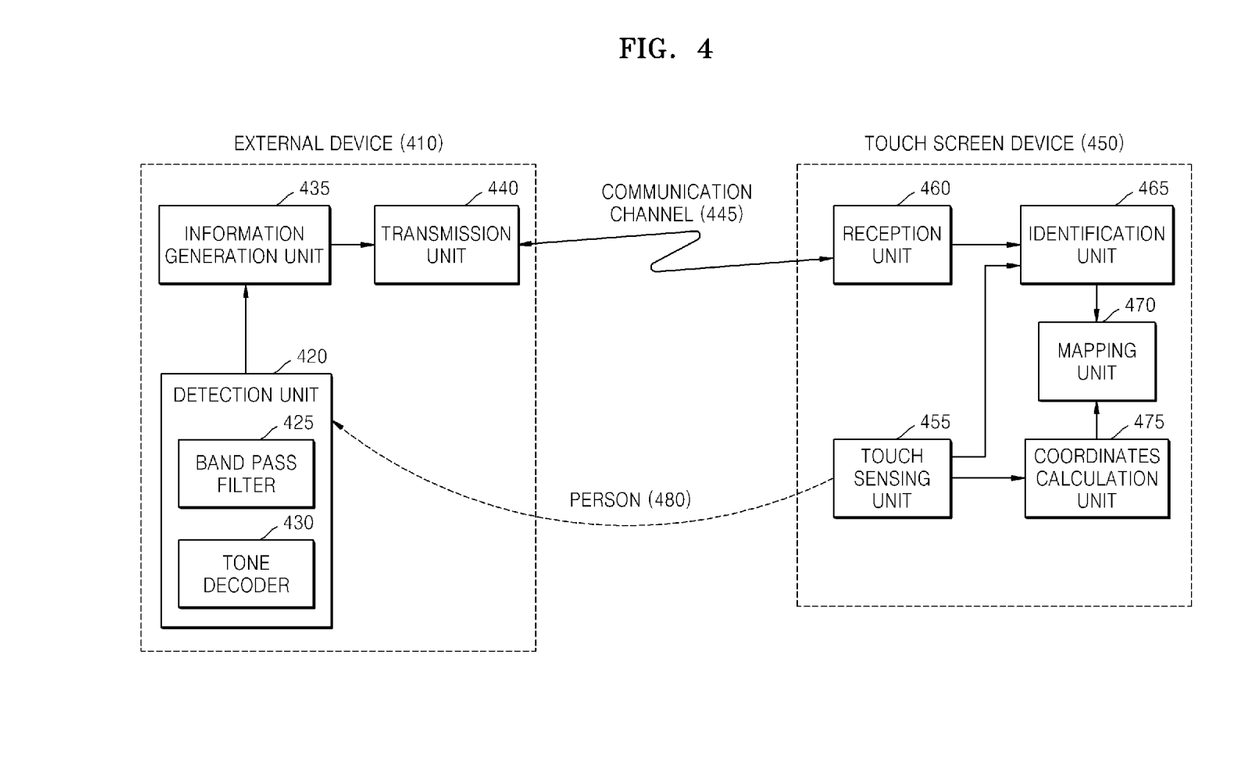
FIG. 4 is a block diagram of a touch-screen based device identification system according to an exemplary embodiment of the present invention.

FIG. 4 is a block diagram of a touch-screen based device identification system according to an exemplary embodiment of the present invention.

Referring to FIG. 4, the touch-screen based device identification system includes an external device 410 and a touch screen device 450. The external device 410 and the touch screen device 450 are connected with each other through a communication channel 445. A person 480 touches a detection unit 420 of the external device 410 with one hand and touches a touch sensing unit 455, i.e., a touch screen surface, of the touch screen device 450 with the other hand.

The touch screen device 450 may include the touch sensing unit 455, a reception unit 460, and an identification unit 465. The touch screen device 450 may further include a mapping unit 470 and a coordinates calculation unit 475.

The touch sensing unit 455 generates a signal induced by touching the touch screen surface. The induced signal is a micro-current signal including a scan frequency component and propagates to the detection unit 420 of the external device 410 via the person 480.

The touch sensing unit 455 can temporarily change a scan frequency of the micro-current signal induced by touching the touch screen surface. An objective that can be achieved by changing the scan frequency has already been described and thus will not be further described here.

The reception unit 460 receives information about the scan frequency component detected by the external device 410 and an ID of the external device 410 through the communication channel 445.

The identification unit 465 identifies the external device 410 by using the information about the scan frequency component and the ID of the external device 410, which are received by the reception unit 460. For example, the identification unit 465 determines a scan frequency based on the information about the scan frequency component and compares the determined scan frequency with a scan frequency of the micro-current signal induced by a touch. If the determined scan frequency is the same as the scan frequency of the induced micro-current signal, the identification unit 465 determines that the touch screen device 450 is connected with the external device 410 having the received ID. Information about the scan frequency of the micro-current signal induced by a touch of the person 480 may be received from the touch sensing unit 455 or may be stored in the identification unit 465.

The coordinates calculation unit 475 calculates coordinates of the touch screen surface touched (that is, first coordinates).

The mapping unit 470 maps the coordinates of the touch screen surface touched to the identified external device 410. By doing so, the touch screen device 450 can act as if a position touched by a hand of the person 480 is touched using the external device 41 and can perform particular processing.

The external device 410 includes a detection unit 420, an information generation unit 435, and a transmission unit 440. The external device 410 may be, for example, a cellular phone, a digital camera, a camcorder, a PDA, an MP3 player, or a PMP.

The detection unit 420 detects a scan frequency component from a micro-current signal propagating from the touch sensing unit 455 and transmits the detected scan frequency component to the information generation unit 435. For example, the detection unit 420 may include a band pass filter 425 and a tone decoder 430. The band pass filter 425 performs band pass filtering on the micro-current signal by using a scan frequency as a center frequency. The tone decoder 430 performs tone-decoding on the band-pass filtered signal output from the band pass filter 425. As a result, the detection unit 420 outputs information indicating whether the scan frequency component is included in the micro-current signal.

The information generation unit 435 generates information about the scan frequency component and ID information of the external device 435 that has received the micro-current signal. The information generation unit 435 previously stores the ID information of the external device 410.

The transmission unit 440 transmits the information about the scan frequency component and the ID information of the external device 410 to the reception unit 460 of the touch screen device 450 through the communication channel 445.

In addition, the external device 410 may be another touch screen device in addition to the touch screen device 450. In this case, the mapping unit 470 may map the second coordinates of the external device 410 to the first coordinates of the touch screen device 450. The mapping unit 470 may perform the mapping operation through the communication channel 445.

In addition, the mapping unit 470 may control a control signal, which allows the object displayed on the first coordinates to be displayed on the second coordinates, transmitted to the external device 410 or received from the external device 410. Consequently, the external device 410 or the touch screen device 450 may execute various application services caused by the linkage between the first and second coordinates based on the mapping result.

The communication channel 445 may be a wired or wireless channel using a PnP protocol such as an UPnP protocol.

Figure 5:
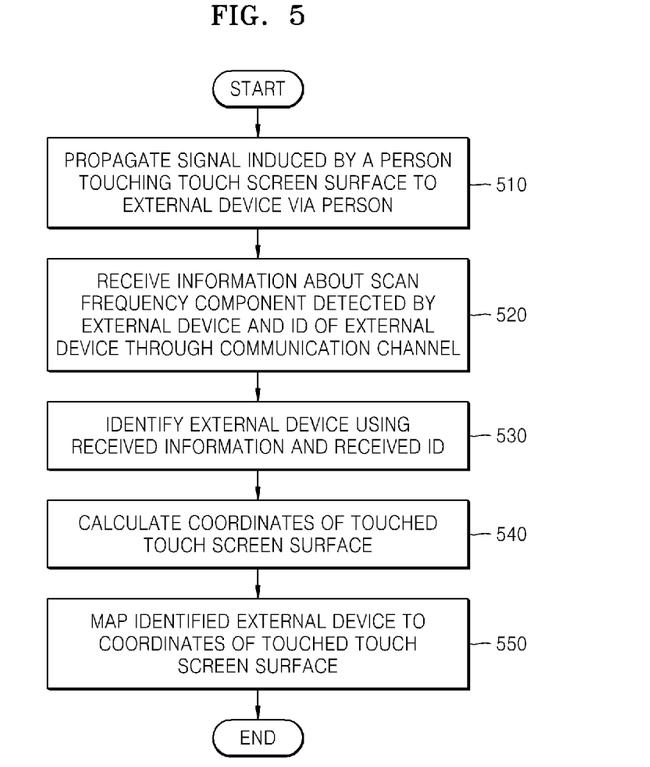
FIG. 5 is a flowchart illustrating a touch-screen based device identification method for a touch screen device according to an exemplary embodiment of the present invention.

FIG. 5 is a flowchart illustrating a touch-screen based device identification method for a touch screen device according to an exemplary embodiment of the present invention.

Referring to FIG. 5, in operation 510, the touch screen device propagates a micro-current signal, including a scan frequency component, induced by touching a touch screen surface to an external device via a person. The external device may be, for example, a cellular phone, a digital camera, a camcorder, a PDA, an MP3 player, or a PMP. The touch screen device may temporarily change a scan frequency of a micro-current induced by touching the touch screen surface.

In operation 520, receives information about the scan frequency component detected by the external device and an ID of the external device from the external device through a communication channel. The communication channel may be a wired or wireless channel using a PnP protocol such as an UPnP protocol.

In operation 530, the touch screen device identifies the external device by using the received information about the scan frequency component and the received ID of the external device. For example, the touch screen device may determine that it is connected with the external device having the received ID if the received information about the scan frequency component is the same as a scan frequency component of the signal induced by a touch.

In operation 540, the touch screen device calculates coordinates of the touched touch screen surface.

In operation 550, the touch screen device maps the external device identified in operation 530 to the calculated coordinates of the touched touch screen surface.

In addition, the touch screen device may calculate first coordinates of the touched point on the touch screen surface, and then, maps the external device to the first coordinates.

In addition, the touch screen device may execute user verification services that allow the external device to access the touch screen device or to access the object displayed on the first coordinates of the touch screen device using the user verification information stored in the external device.

Also, as described above, the external device may be another touch screen device in addition to the touch screen device. In this case, the touch screen device calculates first coordinates of the touched point on the touch screen surface, and then, performs a mapping operation of the calculated first coordinates to second coordinates that represent the touched point on the touch screen surface of another touch screen device through the communication channel.

In addition, the touch screen device may transmit a control signal, which allows the object represented on the first coordinates to be represented on the second coordinates, to the other touch screen device or may receive the control signal from the other touch screen device.

Figure 6:
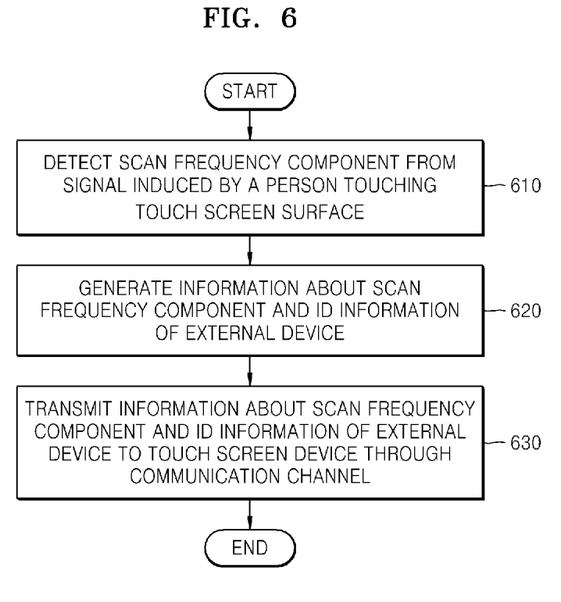
FIG. 6 is a flowchart illustrating a device information provision method for an external device according to another exemplary embodiment of the present invention.

FIG. 6 is a flowchart illustrating a device information provision method for an external device according to another exemplary embodiment of the present invention.

Referring to FIG. 6, in operation 610, the external device detects a scan frequency component from a micro-current signal including a scan frequency component induced by touching a touch screen surface. For example, the external device may perform band-pass filtering on the micro-current signal by using a san frequency as a center frequency and perform tone-decoding on the band-pass filtered signal. The external device may be, for example, a cellular phone, a digital camera, a camcorder, a PDA, an MP3 player, or a PMP.

In operation 620, the external device generates information about the scan frequency component and ID information of the external device that has received the micro-current signal.

In operation 630, the external device transmits the information about the scan frequency component and the ID information to the touch screen device through a communication channel. The communication channel may be a wired or wireless channel using a PnP protocol such as an UPnP protocol.

When the scan frequency of a micro-current induced by touching the touch screen surface is temporarily changed by the touch screen device, the external device may repetitively perform operations 610 through 630.

In addition, when the external device is identified by the touch screen device and is mapped on the first coordinates that represent the touched point on the touch screen surface in the touch screen device, the external device may access the touch screen device using the user verification information stored therein or may execute the user verification process for accessing the object displayed on the first coordinates of the touch screen device.

In addition, the external device may be another touch screen device in addition to the touch screen device. In this case, the external device calculates second coordinates that represent the touched point of the touch screen surface of the external device, and may perform a mapping operation of the second coordinates to the first coordinates of the touch screen device.

In addition, for example, the external device may transmit a control signal, which allows the object displayed on the first coordinates to be displayed on the second coordinates, to the touch screen device or may receive the control signal from the touch screen device.

A program for executing a touch-screen based device identification method according to the present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over network of coupled computer systems so that the computer-readable code is stored and executed in a decentralized fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A device identification method for a touch screen device, the device identification method comprising:
   propagating a signal through a user body to an external device which is in contact with the user body, the signal being induced by the user body touching a touch screen surface of the touch screen device;
   receiving, at the touch screen device, information related to the signal which is detected by the external device and an identification (ID) of the external device through a communication channel other than through the body of the user; and
   identifying, at the touch screen device, the external device based on the received information related to the detected signal and the received ID of the external device;
   wherein the signal is a micro-current signal including a scan frequency component.

2. The device identification method of claim 1, wherein the identifying the external device comprises determining that the touch screen device is connected with the external device having the received ID via the user body if the scan frequency component included in the information related to the signal is the same as a scan frequency component of the signal induced by touching the touch screen surface.

3. The device identification method of claim 1, further comprising:
   calculating first coordinates of the touched touch screen surface; and
   mapping the identified external device to the calculated first coordinates of the touched touch screen surface.

4. The device identification method of claim 3, further comprising:
   executing a user verification for allowing the external device to access the touch screen device or to access an object displayed on the first coordinates using user verification information if the user verification information is stored in the external device.

5. The device identification method of claim 1, wherein the external device is another touch screen device distinct from the touch screen device, and the device identification method further comprises:
   calculating first coordinates of the touched touch screen surface; and
   mapping second coordinates of touched touch screen surface of another touch screen device to the first coordinates,
   wherein the mapping is performed through the communication channel.

6. The device identification method of claim 5, further comprising:
   executing application services, which link the first coordinates with the second coordinates, based on the mapping result.

7. The device identification method of claim 1, further comprising repeating the propagating the signal to the external device and the receiving the information through the communication channel after changing the scan frequency of the signal.

8. The device identification method of claim 1, further comprising:
   receiving a confirmation request signal for identifying whether the touch screen surface of the touch screen device is touched or not from the external device through the communication channel; and transmitting a confirmation response signal which denotes that the touch screen surface of the touch screen device is touched to the external device through the communication channel.

9. The device identification method of claim 1, wherein the communication channel is a wired or wireless channel using a plug and play (PnP) protocol including a universal PnP (UPnP) protocol.

10. The device identification method of claim 1, wherein the communication channel is a wireless communication channel, and the wireless communication channel includes one or more selected from a wireless local area network (LAN), a wireless internet platform for interoperability (WIPI), Bluetooth, infrared communication, near field communication (NFC), and Zigbee, and the external device exchanges information related to the wireless communication channel with the touch screen device.

11. The device identification method of claim 1, wherein the external device is a portable mobile device, and the portable mobile device is one of a cellular phone, a digital camera, a camcorder, a personal digital assistant, an MP3 player, and a portable multimedia player.

12. A device identification method for a touch screen device of claim 1, further comprising changing a scan frequency of a micro current signal induced by touching a touch screen surface when the touch screen device and the external have the same scan frequency.

13. A device identification apparatus for a touch screen device, the device identification apparatus comprising:
 a touch sensing unit which generates a signal induced by a user body touching a touch screen surface of the touch screen device and propagates the signal through the user body to an external device which is in contact with the user body;
 a reception unit which receives information related to the signal propagated through the user body to the external device and detected by an external device and an identification (ID) of the external device through a communication channel other than through the user body; and
 an identification unit which identifies the external device based on the received information related to the signal and the received ID of the external device;
 wherein the signal is a micro-current signal including a scan frequency component.

14. The device identification apparatus of claim 13, wherein the identification unit determines that the touch screen device is connected with the external device having the received ID via the user body if a scan frequency component included in the information related to the signal is the same as a scan frequency component of the signal induced by touching the touch screen surface.

15. The device identification apparatus of claim 13, further comprising:
 a coordinates calculation unit which calculates first coordinates of the touched touch screen surface; and
 a mapping unit which maps the identified external device to the calculated first coordinates of the touched touch screen surface.

16. The device identification apparatus of claim 13, wherein the external device is another touch screen device distinct from the touch screen device, and the device identification apparatus further comprises:
 a coordinate calculating unit calculating first coordinates of the touched touch screen surface; and
 a mapping unit mapping second coordinates of touched touch screen surface of another touch screen device to the first coordinates,
 wherein the mapping unit performs the mapping operation through the communication channel.

17. The device identification apparatus of claim 13, wherein the touch screen device executes application services, which link the first coordinates with the second coordinates, based on the mapping result.

18. The device identification apparatus of claim 13, wherein the communication channel is a wired or wireless channel using a plug and play (PnP) protocol including a universal PnP (UPnP) protocol.

19. The device identification apparatus for a touch screen device of claim 13, wherein the touch screen device is configured to change a scan frequency of a micro current signal induced by touching a touch screen surface when the touch screen device and the external have the same scan frequency.

20. A device information provision method for an external device, the device information provision method comprising:
 detecting a scan frequency component from a signal induced by a user body touching a touch screen surface of a touch screen device and propagated to the external device which is in contact with the user body, through the user body;
 generating information related to the scan frequency component and identification (ID) information of the external device; and
 transmitting the information related to the scan frequency component and the ID information from the external device to the touch screen device through a communication channel other than through the user body;
 wherein the signal is a micro-current signal including the scan frequency component.

21. The device information provision method of claim 20, wherein the detecting the scan frequency component comprises:
 performing band-pass filtering on the signal by using the scan frequency component as a center frequency; and
 performing tone-decoding on the band-pass filtered signal.

22. The device information provision method of claim 20, wherein if the external device is identified by the touch screen device and is mapped to first coordinates of the touched touch screen surface of the touch screen device and stores user verification information, the device information provision method further comprises:
 executing a user verification for allowing the external device to access the touch screen device or to access an object displayed on the first coordinates using the user verification information.

23. The device information provision method of claim 20, wherein the external device is another touch screen device distinct from the touch screen device, and the device information provision method further comprises:
 calculating first coordinates of the touched touch screen surface; and
 mapping second coordinates of touched touch screen surface of another touch screen device to the first coordinates,
 wherein the mapping is performed through the communication channel.

24. The device information provision method of claim 20, further comprising:
 executing application services, which link the first coordinates with the second coordinates, based on the mapping result.

25. The device information provision method of claim 20, further comprising repeating the detecting the scan frequency component, the generating the information and the ID information, and the transmitting the information and the ID information if the scan frequency component of the signal is changed.

26. The device information provision method of claim 20, further comprising:
transmitting a confirmation request signal for identifying whether the touch screen surface of the touch screen device is touched or not to the touch screen device through the communication channel; and
receiving a confirmation response signal which denotes that the touch screen surface of the touch screen device is touched from the touch screen device through the communication channel to identify the touch screen device.

27. The device information provision method of claim 20, wherein the communication channel is a wired or wireless channel using a plug and play (PnP) protocol including a universal PnP (UPnP) protocol.

28. The device information provision method of claim 20, wherein the communication channel is a wireless communication channel, and the wireless communication channel includes one or more selected from a wireless local area network (LAN), a wireless internet platform for interoperability (WIPI), Bluetooth, infrared communication, near field communication (NFC), and Zigbee, and the external device exchanges information related to the wireless communication channel with the touch screen device.

29. The device information provision method of claim 20, wherein the external device is a portable mobile device, and the portable mobile device is one of a cellular phone, a digital camera, a camcorder, a personal digital assistant, an MP3 player, and a portable multimedia player.

30. The device information provision method for an external device of claim 20, further comprising changing a scan frequency of a micro current signal induced by touching a touch screen surface when the touch screen device and the external have the same scan frequency.

31. A device information provision apparatus for an external device, the device information provision apparatus comprising:
a detection unit which detects a scan frequency component from a signal induced by a user body touching a touch screen surface of a touch screen device and propagated to the external device which is in contact with the user body, through the user body;
an information generation unit which generates information related to the scan frequency component and identification (ID) information of the external device; and
a transmission unit which transmits the information related to the scan frequency component and the ID information to a touch screen device through a communication channel other than through the human body;
wherein the signal is a micro-current signal including the scan frequency component.

32. The device information provision apparatus of claim 31, wherein the detection unit comprises:
a band-pass filter which performs band-pass filtering on the signal by using the scan frequency component as a center frequency; and
a tone-decoder which performs tone-decoding on the band-pass filtered signal.

33. The device information provision apparatus of claim 31, wherein the external device is another touch screen device in addition to the touch screen device, and the device information provision apparatus further comprises:
a coordinate calculating unit calculating second coordinates of the touched touch screen surface of another touch screen device; and
a mapping unit mapping the second coordinates of the touched touch screen surface to the first coordinates of the touch screen device, wherein
the mapping unit performs the mapping operation through the communication channel.

34. The device information provision apparatus of claim 33, wherein the external device executes application services, which link the first coordinates with the second coordinates, based on the mapping result.

35. The device information provision apparatus of claim 31, wherein the communication channel is a wired or wireless channel using a plug and play (PnP) protocol including a universal PnP (UPnP) protocol.

36. The device information provision apparatus for an external device of claim 31, wherein the touch screen device is configured to change a scan frequency of a micro current signal induced by touching a touch screen surface when the touch screen device and the external have the same scan frequency.

37. A non-transitory computer-readable recording medium having recorded thereon a program for executing a device identification method for a touch screen device, the device identification method comprising:
propagating a signal through a user body to an external device which is in contact with the user body, the signal being induced by the user body touching a touch screen surface of the touch screen device;
receiving, at the touch screen device, information related to the signal which propagated to and detected by the external device and an identification (ID) of the external device through a communication channel other than through the user body; and
identifying, at the touch screen device, the external device based on the received information related to the detected signal and the received ID of the external device;
wherein the signal is a micro-current signal including a scan frequency component.

38. The non-transitory computer-readable recording medium having recorded thereon a program for executing a device identification method for a touch screen device of claim 37, further comprising changing a scan frequency of a micro current signal induced by touching a touch screen surface when the touch screen device and the external have the same scan frequency.

39. A non-transitory computer-readable recording medium having recorded thereon a program for executing a device information provision method for an external device, the device information provision method comprising:
detecting, at the external device, a scan frequency component from a signal induced by a user body touching a touch screen surface of a touch screen device and propagated to the external device, which is in contact with the user body, through the user body;
generating, at the external device, information related to the scan frequency component and identification (ID) information of the external device that has received the signal; and
transmitting the information related to the scan frequency component and the ID information from the external device to the touch screen device through a communication channel other than through the user body;
wherein the signal is a micro-current signal including the scan frequency component.

40. The A non-transitory computer-readable recording medium having recorded thereon a program for executing a device information provision method for an external device of claim 39, further comprising changing a scan frequency of a micro current signal induced by touching a touch screen surface when the touch screen device and the external have the same scan frequency.

\* \* \* \* \*